(12) United States Patent
Ezawa

(10) Patent No.: US 7,573,526 B2
(45) Date of Patent: Aug. 11, 2009

(54) ELECTRONIC CAMERA HAVING AN IMAGE PICK-UP UNIT OPPOSING A SHUTTER UNIT

(75) Inventor: Akira Ezawa, Kawasaki (JP)

(73) Assignee: Nikon Corporation, Tokyo (JP)

( * ) Notice: Subject to any disclaimer, the term of this patent is extended or adjusted under 35 U.S.C. 154(b) by 612 days.

(21) Appl. No.: 10/688,922

(22) Filed: Oct. 21, 2003

(65) Prior Publication Data

US 2005/0041137 A1    Feb. 24, 2005

Related U.S. Application Data

(63) Continuation of application No. 09/174,095, filed on Oct. 16, 1998, now abandoned.

(30) Foreign Application Priority Data

Oct. 17, 1997  (JP)  .................................. 9-285401
Feb. 4, 1998   (JP)  ................................ 10-023210

(51) Int. Cl.
*H04N 5/235*   (2006.01)
*H04N 5/225*   (2006.01)
*G03B 7/00*    (2006.01)

(52) U.S. Cl. ........................ 348/362; 348/374; 396/220

(58) Field of Classification Search ................. 348/362, 348/344, 374; 396/194, 220
See application file for complete search history.

(56) References Cited

U.S. PATENT DOCUMENTS

| | | | |
|---|---|---|---|
| 3,995,285 A | 11/1976 | Kondo | |
| 4,611,243 A | 9/1986  | Morisawa et al. | |
| 4,626,918 A | 12/1986 | Morisawa | |
| 4,682,237 A | 7/1987  | Kato et al. | |
| 4,689,689 A | 8/1987  | Saito et al. | |
| 4,757,387 A | 7/1988  | Saito | |
| 5,483,284 A | 1/1996  | Ishiguro | |
| 5,815,757 A | 9/1998  | Katsura et al. | |
| 6,126,334 A * | 10/2000 | Ohmori | 348/374 |
| 6,134,393 A * | 10/2000 | Melman | 396/429 |

FOREIGN PATENT DOCUMENTS

| | | | |
|---|---|---|---|
| JP | A 02-308231 | 12/1990 | |
| JP | A 06-308576 | 11/1994 | |
| JP | 07098481 | * | 4/1995 |
| JP | 07098481 A | 4/1995 | |

* cited by examiner

*Primary Examiner*—Nhan T Tran
(74) *Attorney, Agent, or Firm*—Oliff & Berridge, PLC

(57) ABSTRACT

By using a focal plane shutter having one set of shutter blades as a shielding member of an image pick-up element, it is possible to miniaturize the shutter compared to a focal plane shutter having two sets of blades. This enables the operation to be simplified, and also saves space. Furthermore, in an electronic camera having this focal plane shutter, because the shooting lens side of the image pick-up element that is disposed in the main camera body can be disposed protruding into the shutter unit, the length of the main camera body in the direction of the optical path of the shooting lens can be reduced, and it is possible to form the main camera body small compared to a conventional main camera body.

8 Claims, 18 Drawing Sheets

ELECTRONIC CAMERA HAVING AN IMAGE PICK-UP UNIT OPPOSING A SHUTTER UNIT

This is a Continuation of application Ser. No. 09/174,095 filed Oct. 16, 1998. The entire disclosure of the prior application is hereby incorporated by reference herein in its entirety.

INCORPORATION BY REFERENCE

The disclosures of the following priority applications are herein incorporated by reference: Japanese Patent Application No. 9-285401 filed on Oct. 17, 1997 and Japanese Patent Application No. 10-023210 on filed Feb. 4, 1998.

BACKGROUND OF THE INVENTION

1. Field of Invention

The present invention relates to electronic cameras that obtain an image signal by forming an object image on a solid-state image pick-up element that accumulates charge, such as, for example, a charge-coupled-device (CCD), and particularly to electronic cameras that shield the light supplied to the image pick-up element after charge accumulation.

2. Description of Related Art

Electronic cameras typically include a CCD as a solid-state image pick-up element. Charge accumulated on the CCD as image information is read, processed and recorded in a recording medium. Particularly when a frame transfer type CCD or a two-field reading type interline CCD is used, it is desirable to perform the reading of the charge in a state where the CCD is shaded from light. Furthermore, with other types of CCDs as well, it is desirable to read the charge when shielding the light to the CCD in order to seek a high quality image by positively preventing smear (a phenomenon where the charge that overflows from the CCD pixels flows into a transferring part, which causes vertical lines to appear in the image). For example, when an electronic camera is formed by incorporating a CCD into a single lens reflex camera that uses a silver halide film that has conventionally existed, it was normal to perform the shielding of the CCD using an existing focal plane shutter of the single lens reflex camera.

In an ordinary single lens reflex camera for use with silver halide film, a focal plane shutter has two sets of blade groups called a front curtain and a rear curtain, and the film is exposed by opening and closing these curtains at about the same time. Additionally, for example, there are cases when only the front curtain is closed before exposure (i.e, the rear curtain remains open), the front curtain is opened when the release button is depressed, and then exposure is completed by closing the rear curtain. Furthermore, as another type, there is a type in which the shielding is improved by closing both the front and rear curtains before exposure (this is called a double shielding shutter), the rear curtain is opened prior to exposure, exposure begins by opening the front curtain, and, subsequently, exposure is completed by closing the rear curtain. In either type, by accurately changing the time between the front curtain being opened and the rear curtain being closed, a plurality of shutter speeds (exposure times) are realized.

However, if a shutter is to be used for shielding of the CCD only, one set of shutter blades is sufficient, and high accuracy is not required for driving. In the conventional single lens reflex electronic camera, because the relatively large focal plane type shutter for silver halide film, with two sets of shutter blades, is used as-is for the shielding member of the CCD, this can be a disadvantage in terms of space. Additionally, there is waste in driving the shutter blade (waste in terms of time and energy consumption).

SUMMARY OF THE INVENTION

An object of the present invention is to provide an electronic camera that has advantages in terms of both space and function by using a focal plane shutter having one set of shutter blades as a shielding member of an image pick-up element (a photoelectric converter).

Another object of the present invention is to form a relatively small main camera body, compared to a conventional main camera body, because a shooting lens-side of an image pick-up unit that is disposed in the main camera body is arranged protruding into the shutter unit, so the length of the main camera body in the optical path direction of the shooting lens is shortened.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

A first embodiment of the present invention is explained with reference to FIGS. 1-11.

Figure 1:
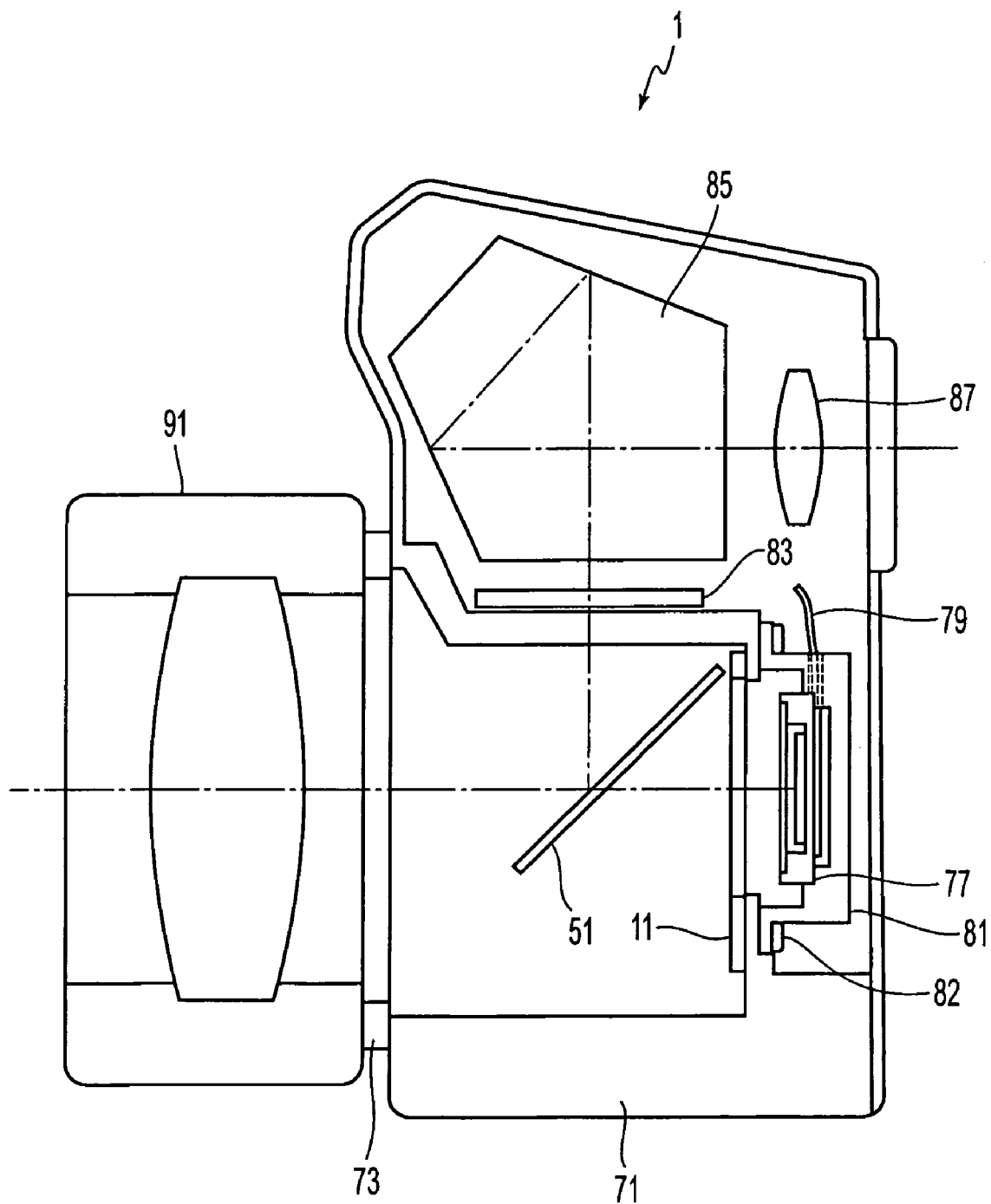
FIG. 1 is a side view showing the structure of a single lens reflex electronic camera according to one embodiment of the present invention.

FIG. 1 is a diagram of a single lens reflex electronic camera 1 according to the first embodiment as seen from the side. An interchangeable lens 91 is detachably mounted to the main camera body 71 through a lens mount 73. After luminous flux (i.e., light) from an object passes through the interchangeable lens 91, it is reflected by the mirror 51, forms an image on a viewfinder screen 83, and can be observed by an eyepiece 87 after passing through a pentaprism 85, as is well known. During shooting (i.e., image capture), the mirror 51 springs up and the object luminous flux forms an image on the light receiving face of the CCD 77, which is a solid-state image pick-up element. CCD 77 is fixed in a CCD holder 81, and the photoelectrical conversion output of the CCD 77 is read by circuitry on a flexible printed circuit board 79. CCD holder 81 is fixed in the main camera body 71 by a screw 82. A focal plane shutter 11 is disposed in front of the CCD 77.

Figure 10:
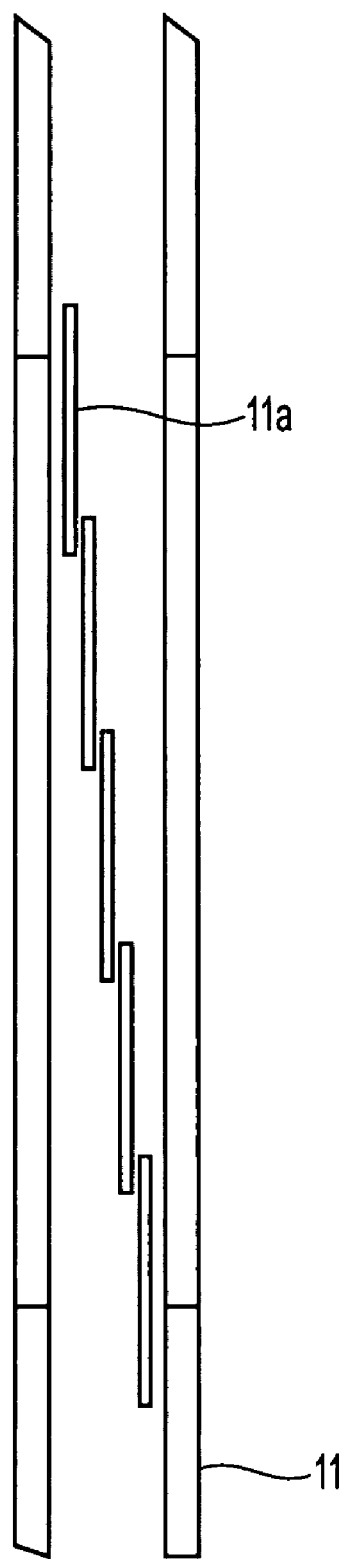
FIG. 10 is a sectional view showing the structure of the focal plane shutter of the above-mentioned camera.

The electronic camera shutter in the present embodiment is a so-called electronic shutter. As is known, with an electronic shutter, the exposure time is controlled by varying the charge accumulation time of the CCD (as opposed to a mechanical shutter, which physically blocks light from reaching the imaging plane where film or a CCD is located). In an electronic shutter, the charge accumulation time of the CCD 77 in the state where the object luminous flux is received by the CCD 77 is equivalent to the shutter speed. The focal plane shutter 11 is used only to perform the shielding of the CCD 77 after the charge accumulation is completed; it is not used to govern the charge accumulation time. Therefore, it is not necessary to provide (or accurately operate) two sets of shutter blades, i.e., front and rear curtains. One set of blades is sufficient. That is, in the present invention the mechanical shutter is only used to shade the CCD 77 during reading of the accumulated charge from the CCD 77. The mechanical shutter is not used to control the charge accumulation time (i.e., it does not control the exposure time). FIG. 10 is a sectional view in which the focal plane shutter 11 of the first embodiment is seen from the side. It is possible to make the thickness of the shutter unit thin, compared to a conventional focal plane shutter having two sets of blades, by having only one set of blades 11a. This is an advantage in terms of space.

FIGS. 2-9 show the driving mechanisms of the mirror 51 and the shutter 11. In each figure, the depicted top part shows the mirror 51 and the sequence switch 57 from the camera side, and the depicted bottom part shows the shutter 11 from the interchangeable lens 91 side of FIG. 1. Hereafter, the structure of each part is explained in detail by referring to FIG. 2.

Figure 2:
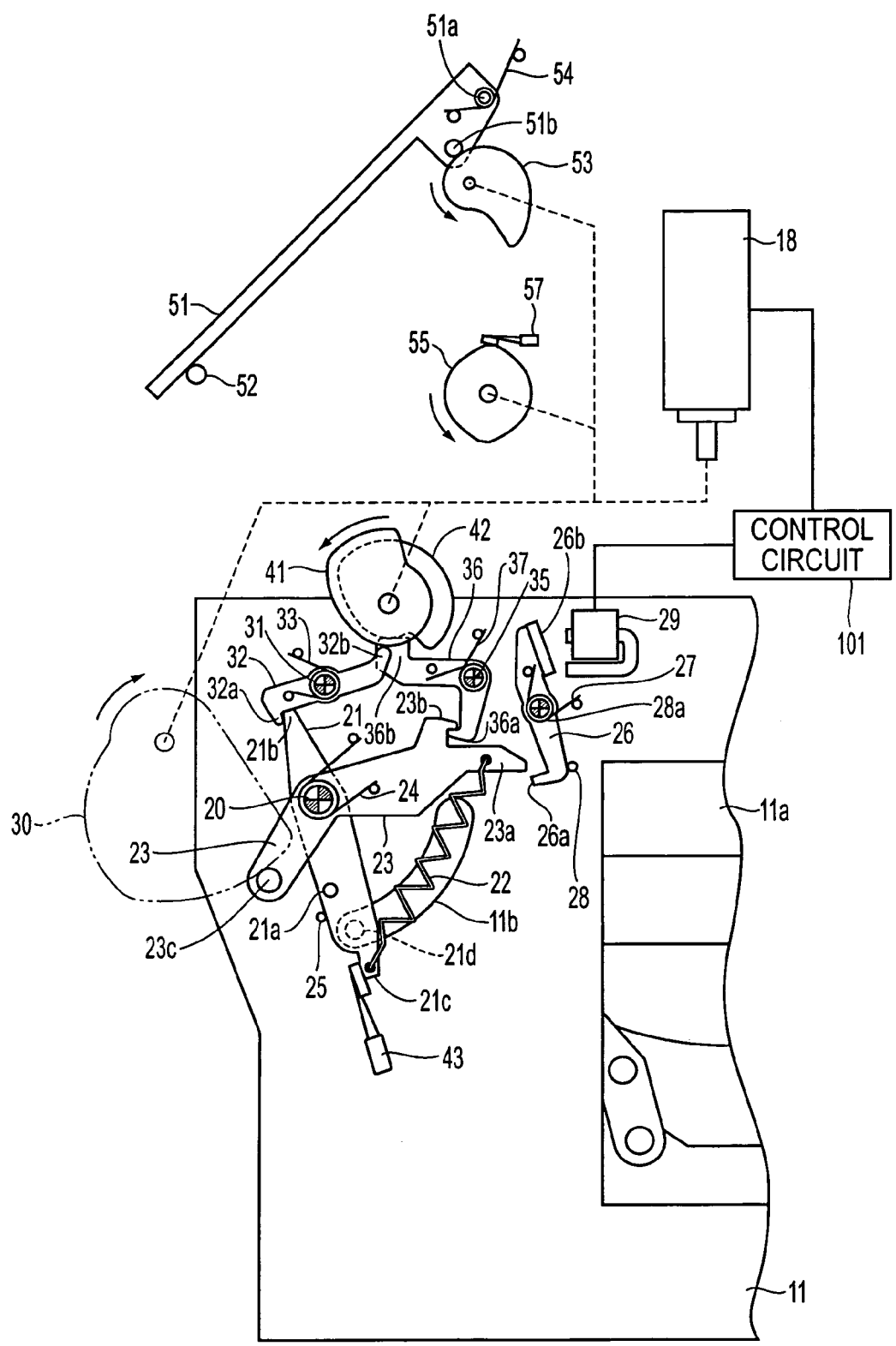
FIG. 2 is a diagram explaining the operation of the mirror and shutter of the above-mentioned camera and shows a state before the release operation.

The sequence motor 18 is a driving source for both the mirror 51 and the shutter 11, and is drive-controlled by the control circuit 101. In response to a positive rotation of the sequence motor 18, the mirror cam plate 53, the switch cam plate 55, the first cam 41, and the second cam 42 (cams 41 and 42 are integrated, i.e., they move together) are rotated in a counterclockwise direction, and the charge cam 30 is rotated in a clockwise direction. The rotation angle of each cam with respect to the same rotation amount of the motor 18 is identical, and when each cam is rotated 360°, the sequence completes one cycle and one frame of shooting is completed. In the following explanation, the cam position of FIG. 2 is the reference position, and the rotation angle from the reference position is referred to as the cam angle.

The mirror 51 is rotatably supported in the main camera body 71 through the mirror supporting axis 51a, receives an applied force in the depicted counterclockwise direction from the spring 54, and is maintained at the 45° position by the mirror stop 52. The mirror driving pin 51b provided integrally with the mirror 51 is driven by the mirror cam plate 53 so that the mirror 51 is raised (rotated) in the clockwise direction from the 45° position. The sequence switch 57 is turned ON and OFF by the switch cam plate 55, and is turned ON when the cam angle is 0° and 180°.

The shutter 11 has a shutter blade 11a comprising five blades. The five blades are linked together by a well-known arm mechanism and structured to be opened and closed. The first lever 21 for the shutter driving is rotatably axis-supported on the shutter 11 by an axis 20 and the rotation in the clockwise direction is limited by a limiting pin 25 attached to the shutter 11. A blade driving pin 21d is attached to the rear side of the first lever 21, and the shutter blade 11a is opened and closed as pin 21d moves within a slot 11b. Specifically, when the first lever 21 is in the position as shown in FIG. 2, the shutter blade 11a is completely closed, and when the first lever 21 is rotated approximately 68° in the counterclockwise direction, the shutter blade 11a is completely opened.

One end (engaging end) 21b of the first lever 21 is engaged by a hook part 32a of the first engaging lever 32, which will be described later. Rotation of the first lever 21 in the counterclockwise direction (shutter blade open direction) is prevented by the hook part 32a. Another end 21c of the first lever 21 turns ON the curtain switch 43 when the shutter blade is closed.

The second lever 23 is independent from the first lever 21 and is rotatably axis-supported by the axis 20. It is urged in the clockwise direction by a spring 24, is connected to the first lever 21 by a tension spring 22, and the force of the spring 22 urges the first lever 21 in the counterclockwise direction. A charge pin 23c, which is attached to one end of the second lever 23, receives a force from the charge cam 30 and rotates the second lever 23, and an engaging part 23b is engaged by the second engaging lever 36, which will be described later. Furthermore, the rotation of the second lever 23 with respect to the first lever 21 is controlled by an engaging pin 21a attached to the first lever 21.

The first engaging lever 32 is rotatably axis-supported on the shutter 11 by an axis 31 and is urged in the counterclockwise direction by a spring 33. A cam following part 32b receives a force from the first cam 41 so that the first engaging lever 32 is rotated against the applied force of the spring 33. The hook part 32a engages the engaging end 21b of the first lever 21 as described above so that the shutter blade 11a is maintained at the closed position.

The second engaging lever 36 is rotatably axis-supported on the shutter 11 by axis 35 and is urged in the clockwise direction by a spring 37. A cam following part 36b receives a force from the second cam 42 so that the second engaging lever 36 is rotated against the applied force of the spring 37. The hook part 36a engages the second engaging part 23b of the second lever 23, and rotation of the second lever 23 in the clockwise direction is prevented. The first cam 41 and the second cam 42 are integrated and are axis-supported on the main camera body 71.

A magnet lever 26 is rotatably axis-supported on the shutter 11 by an axis 28a and is urged in the counterclockwise direction by a spring 27. The rotation of the magnet lever 26 in the counterclockwise direction is regulated by a pin 28. When electricity to the magnet 29 is turned ON by the control circuit 101, the adsorption part 26b is adsorbed by (attracted to) the magnet 29 so that the magnet lever 26 is rotated in the clockwise direction against the spring 27, and the hook part 26a engages the engaging part 23a of the second lever 23, and the rotation of the second lever 23 in the clockwise direction is prevented. In the state where the electricity to the magnet 29 is interrupted, engagement between the hook part 26a and the engaging part 23a is as depicted in FIG. 2 (disengaged).

Figure 11:
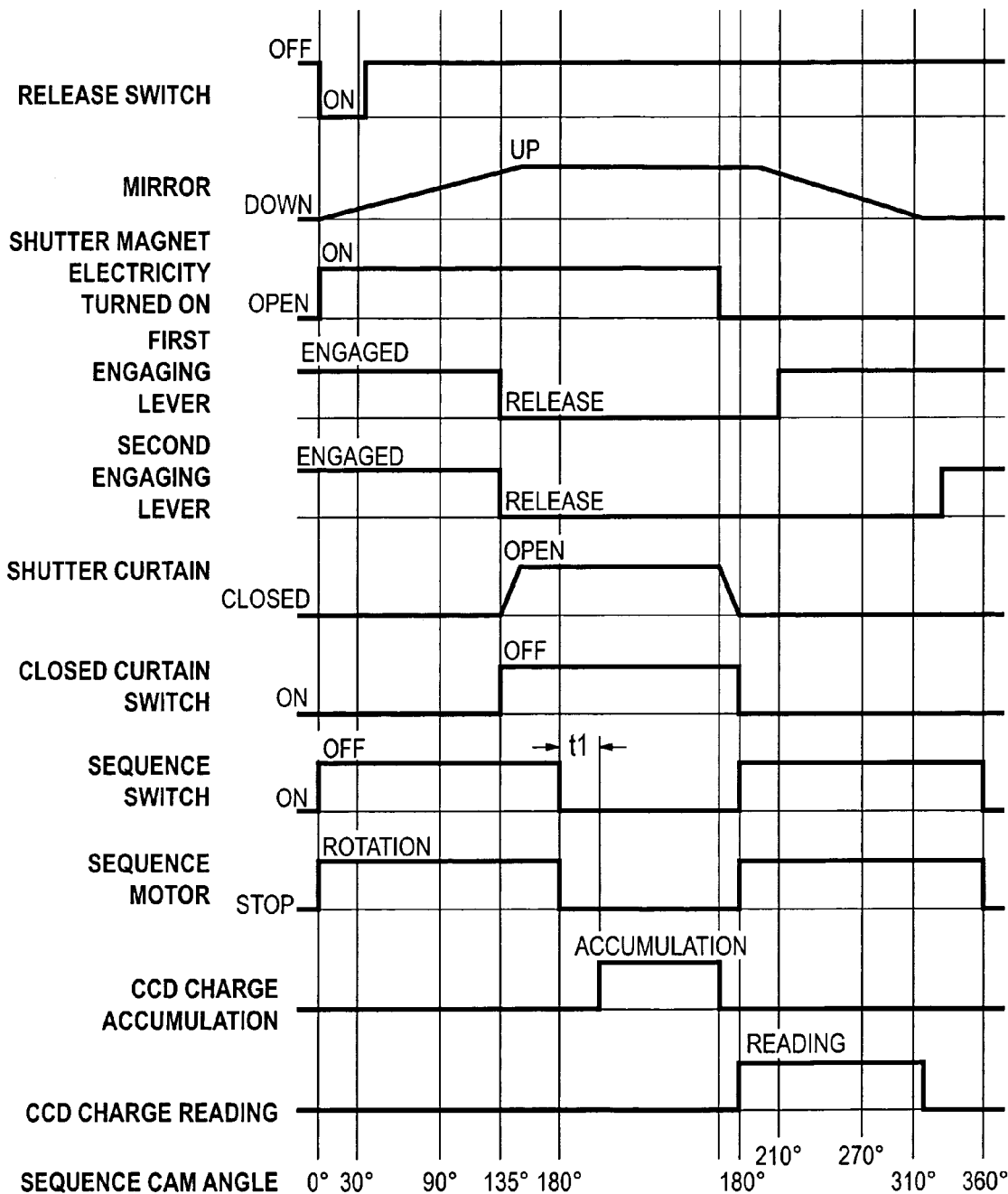
FIG. 11 is a timing diagram explaining the operation of each part along with the time during execution of the shooting sequence.

The shooting sequence (the operations from the release operation of shooting one frame and returning to the state prior to the release operation) of the electronic camera that is thus structured is explained by referring to FIGS. 2-9 and FIG. 11. FIG. 11 shows the operation of the main structural elements in the shooting sequence by taking the horizontal axis as the time axis, and corresponds to the operation of FIGS. 2-9.

FIG. 2 shows the state before an undepicted release button is operated. At this time, the cam angle is 0°, the mirror 51 is at the 45° position, and the sequence switch 57 is in the ON state by the switch cam plate 55. The first lever 21 is prevented from being rotated in the counterclockwise direction by the tension spring 22 by the engaging lever 32. Therefore, the shutter blade 11a is in a closed state, and the close curtain switch 43 is turned ON by the end part 21c of the first lever 21. The second lever 23 is prevented from being rotated in the clockwise direction by the spring 24 by the second engaging lever 36.

Figure 3:
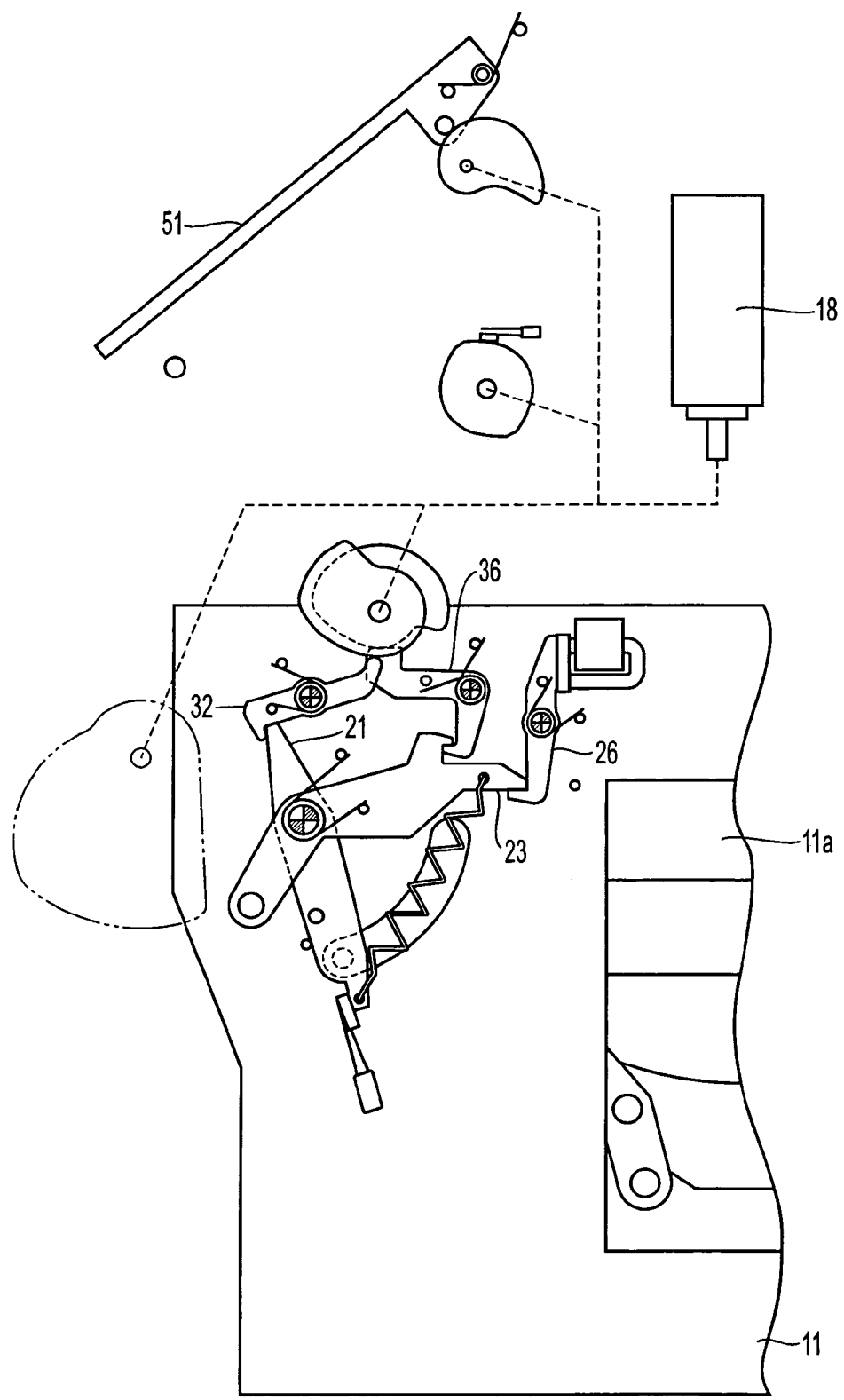
FIG. 3 is a view similar to that of FIG. 2, and shows a state in the middle of "mirror up"

When the undepicted release button is operated in the FIG. 2 state, the control circuit 101 turns ON electricity to the magnet 29, the adsorption part 26b of the magnet lever 26 is adsorbed (attracted to the magnet 29) and the positive rotation of the sequence motor 18 begins. The hook part 26a engages the engaging part 23a of the second lever 23 by the adsorption of the magnet lever 26. Furthermore, each cam is rotated by the rotation of the motor 18, and when the mirror 51 begins to rise by the rotation of the mirror cam plate 53, the sequence switch 57 is turned OFF by the rotation of the switch cam plate 55. FIG. 3 shows the state when each cam angle becomes 30°. At this point, engagement by the first and second engaging levers 32 and 36 is not yet released, so the initial position of FIG. 2 is maintained for the first and second levers 21 and 23.

Figure 4:
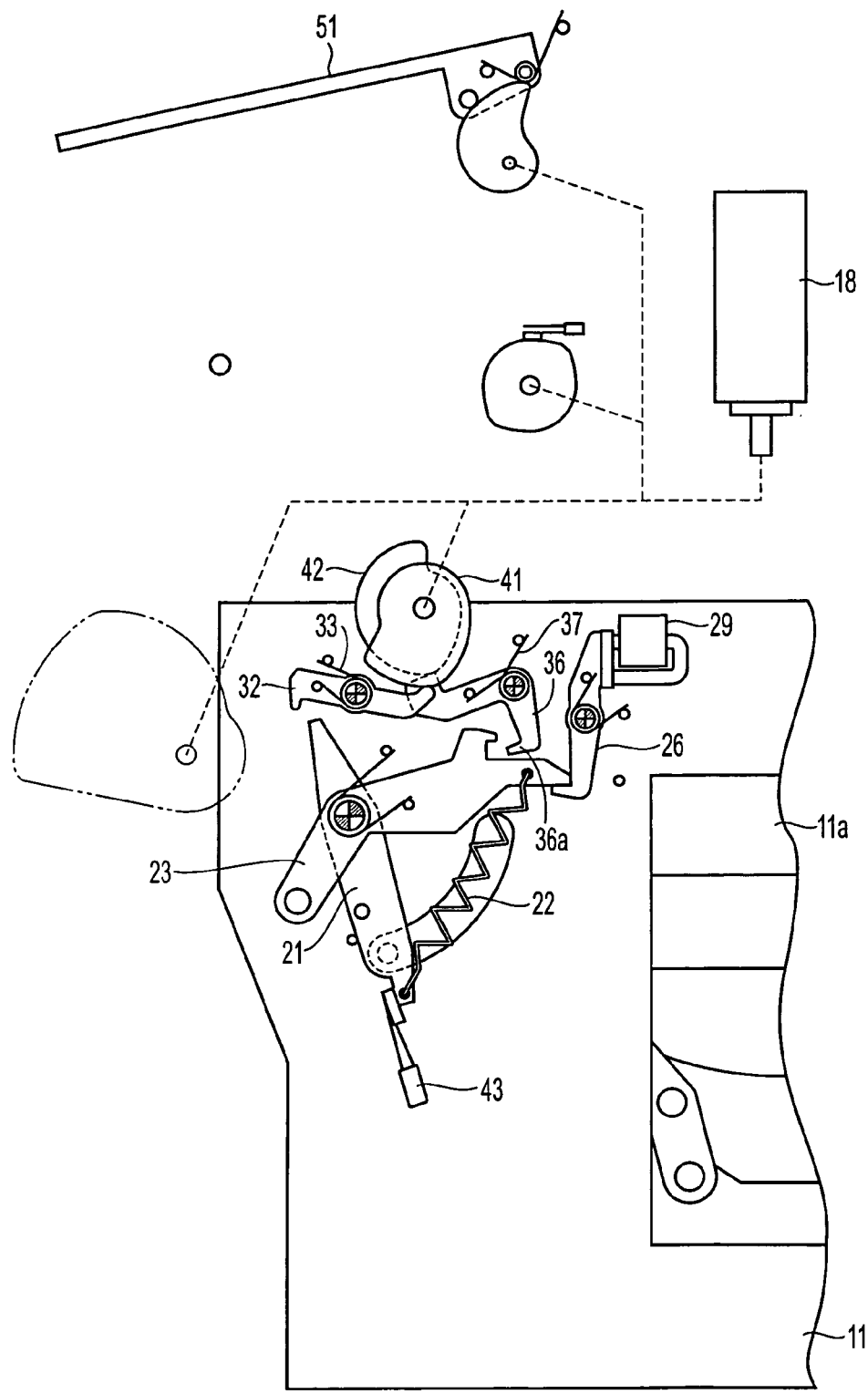
FIG. 4 is a diagram showing a state where engagement of the lever 23 by the lever 36 is interrupted after the state shown in FIG. 3.

The motor 18 continues to be rotated, and when the cam angle becomes 135°, the state is as shown in FIG. 4. The mirror 51 further rises, the second engaging lever 36 is rotated in the counterclockwise direction against the spring 37 by the second cam 42, and engagement of the second lever 23 by the hook part 36a is released. However, the second lever 23 does not move because it is engaged by the magnet lever 26. Meanwhile, the first engaging lever 32 is rotated in the clockwise direction against the spring 33 by the first cam 41, and engagement of the first lever 21 is released. Because of this disengagement, the first lever 21 is pulled by the spring 22, rotation begins in the counterclockwise direction, and the close curtain switch 43 is turned OFF. In response to the rotation of the first lever 21, the shutter blade 11a begins its opening operation.

Figure 5:
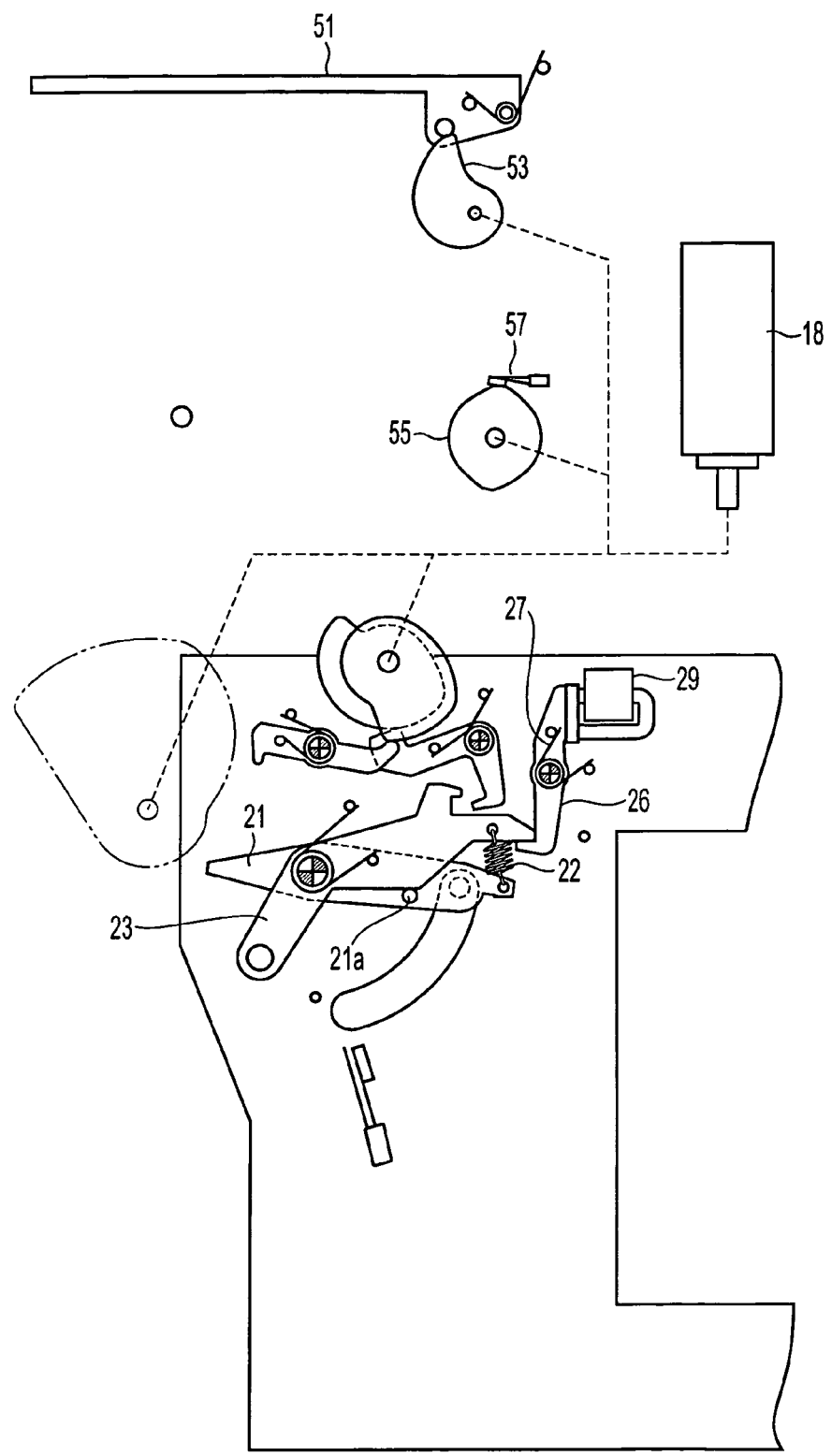
FIG. 5 is a diagram showing a state where the shutter is opened after the state shown in FIG. 4.

After the shutter blade 11a is completely opened, when the cam angle becomes 180°, the state is as shown in FIG. 5. At this time, the mirror 51 is completely raised up by the mirror cam plate 53 and is away from the optical path of the object luminous flux. Furthermore, the sequence switch 57 is turned ON again by the switch cam plate 55. The first lever 21 is stopped because the engaging pin 21a is in contact with the second lever 23. In response to the ON state of the sequence switch 57, the control circuit 101 (FIG. 2) stops the sequence motor 18 and each member is stopped in the state of FIG. 5.

By raising up the mirror 51 and opening the shutter blade 11a, the object luminous flux that passes through the shooting lens is led to the light receiving face of the CCD 77 and is image-formed. The control circuit 101 operates the timer in response to the ON state of the sequence switch 57, and the charge accumulation by the CCD 77 begins when a specified time period t1 (FIG. 11) has elapsed. The specified time period t1 is a time sufficient to dampen the vibration of the raised-up mirror 51. By providing this time period, accumulation does not begin when there is a possibility that the mirror 51 may be inserted into the optical path by vibrating. When a specified accumulation time elapses from the accumulation start, the accumulation operation is completed. This accumulation time is set in advance in response to the illumination conditions of the object or the like.

Figure 6:
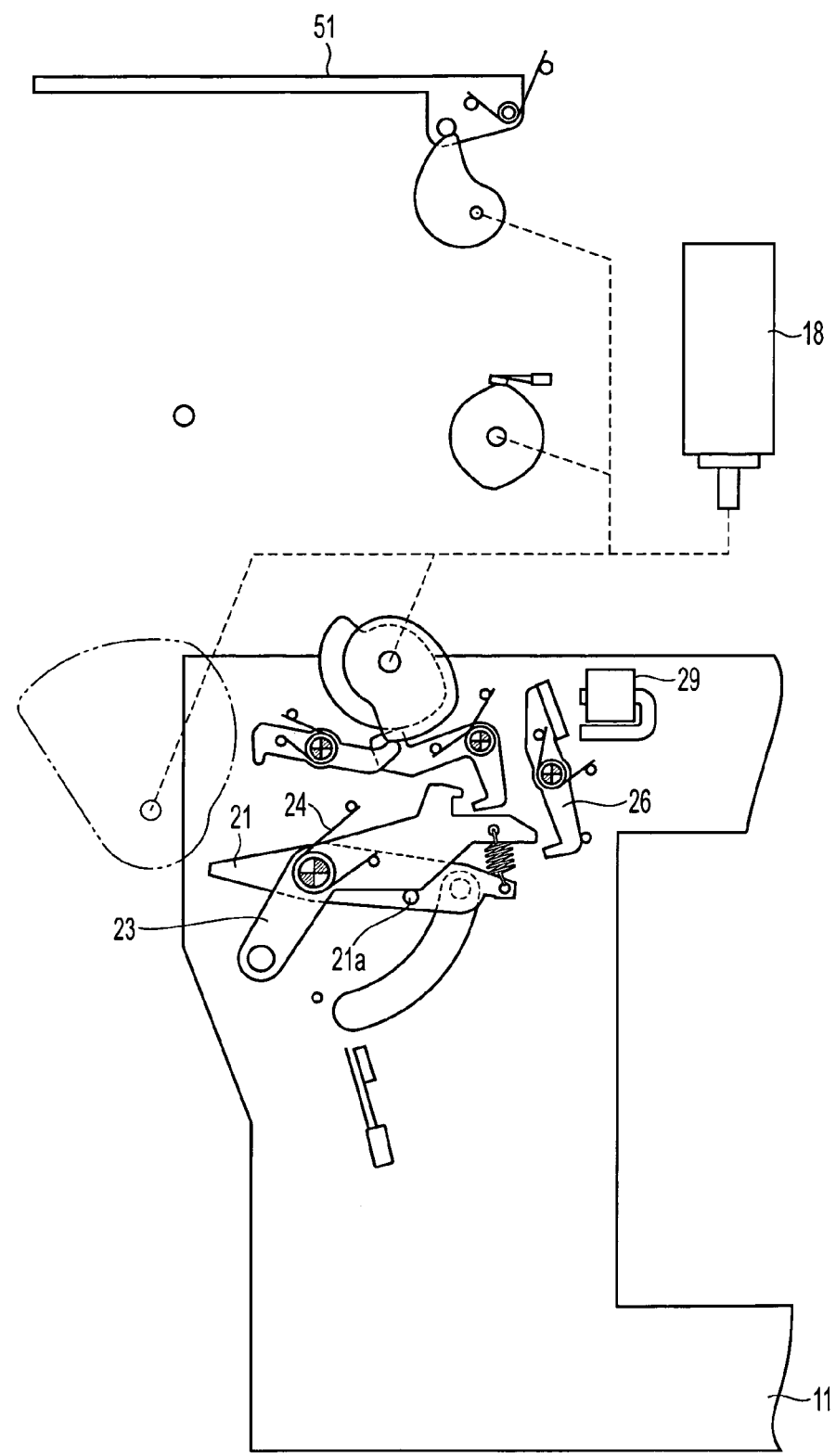
FIG. 6 is a diagram showing a state where electricity to the magnet is turned OFF after the state shown in FIG. 5.
Figure 7:
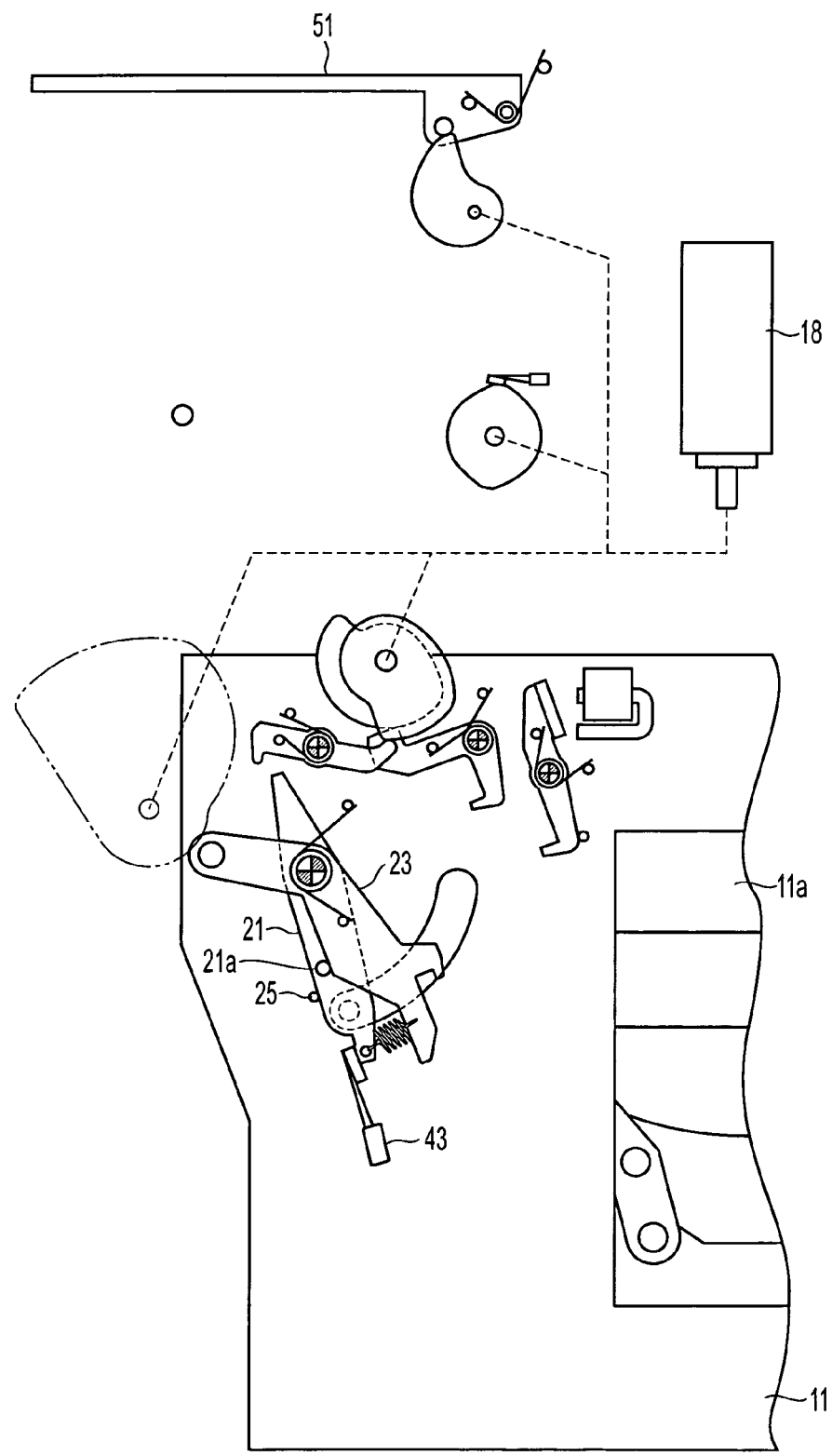
FIG. 7 is a diagram showing a state where the shutter is closed after the state shown in FIG. 6.

After the charge accumulation is completed, prior to reading the charge, the control circuit 101 turns OFF electricity to the magnet 29 in order to close the shutter blade 11a. By this operation, the magnet lever 26 is rotated in the counterclockwise direction by the spring 27, and the engagement of the second lever 23 is released. FIG. 6 shows the moment of this disengagement. The second lever 23 that has been disengaged is then immediately rotated in the clockwise direction by the applied force of the spring 24, and the first lever 21 is integrally rotated in the same direction by the engagement between the second lever 23 and the engagement pin 21a. The closing operation of the shutter blade 11a begins by the rotation of the first lever 21. As shown in FIG. 7, when the first lever 21 contacts the limiting pin 25, the rotation of both levers 21 and 23 stops. At this time, when the shutter blade 11a is completely closed and light to the CCD 77 is shaded, the close curtain switch 43 is turned ON. In response to the ON state of the close curtain switch 43, the control circuit 101 begins the charge reading of the CCD 77. Thus, after the charge accumulation is completed, the CCD 77 is shaded by the shutter 11 and smear can be held to a minimum by performing the charge reading in the shaded state.

Figure 8:
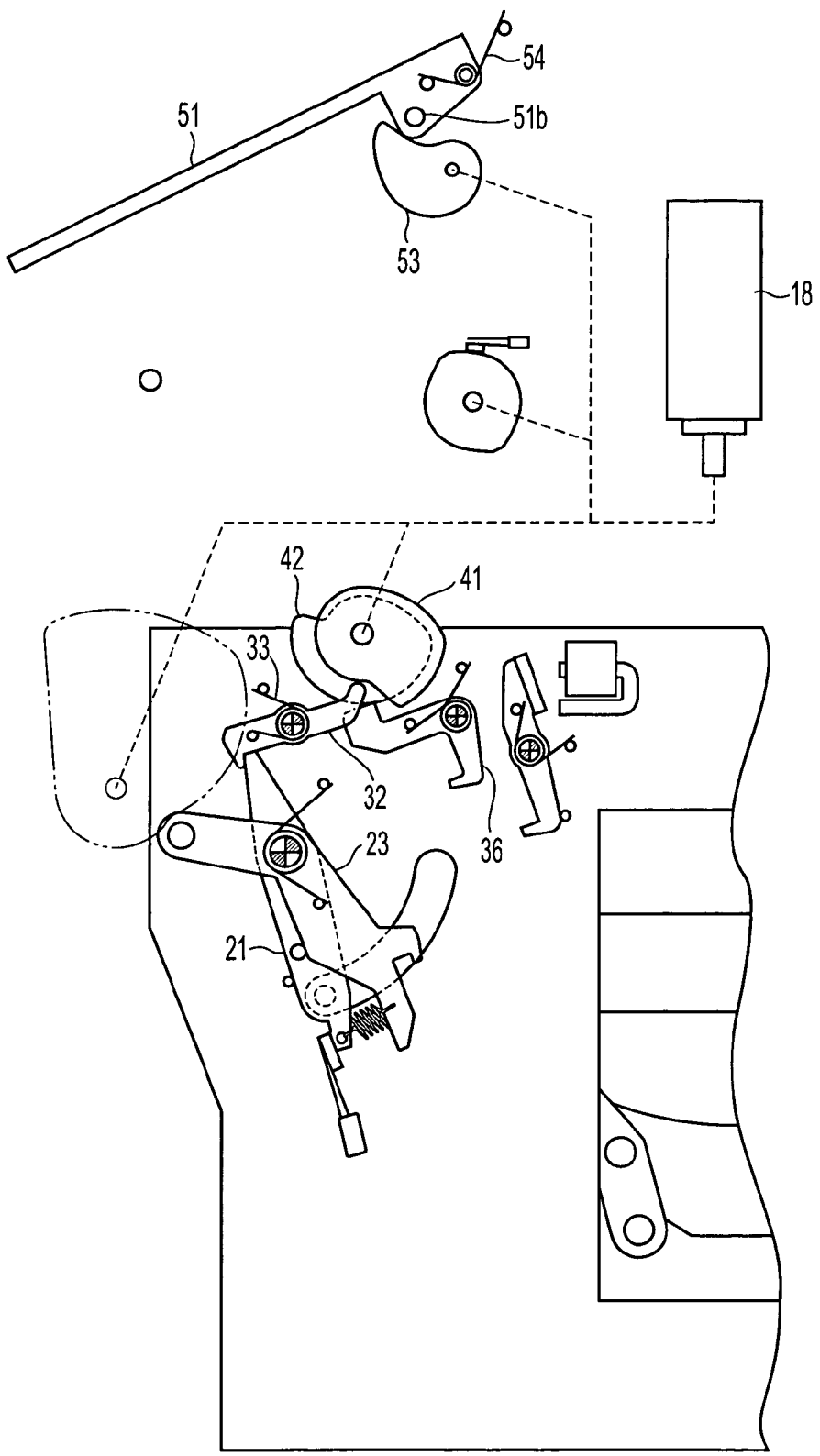
FIG. 8 is a diagram showing the process of "mirror down" after the state shown in FIG. 7.

The control circuit 101 begins the charge reading and, simultaneously, re-starts the positive rotation of the sequence motor 18. Each cam is rotated by the rotation of the motor 18, and when the cam angle reaches 210°, the state is as shown in FIG. 8. During this time, since the mirror cam plate 53 is away from the mirror driving pin 51b, the mirror 51 begins dropping due to the mirror spring 54. Additionally, since the first cam 41 is away from the first engaging lever 32, the first engaging lever 32 is rotated in the counterclockwise direction by the spring 33, and engages the first lever 21.

Figure 9:
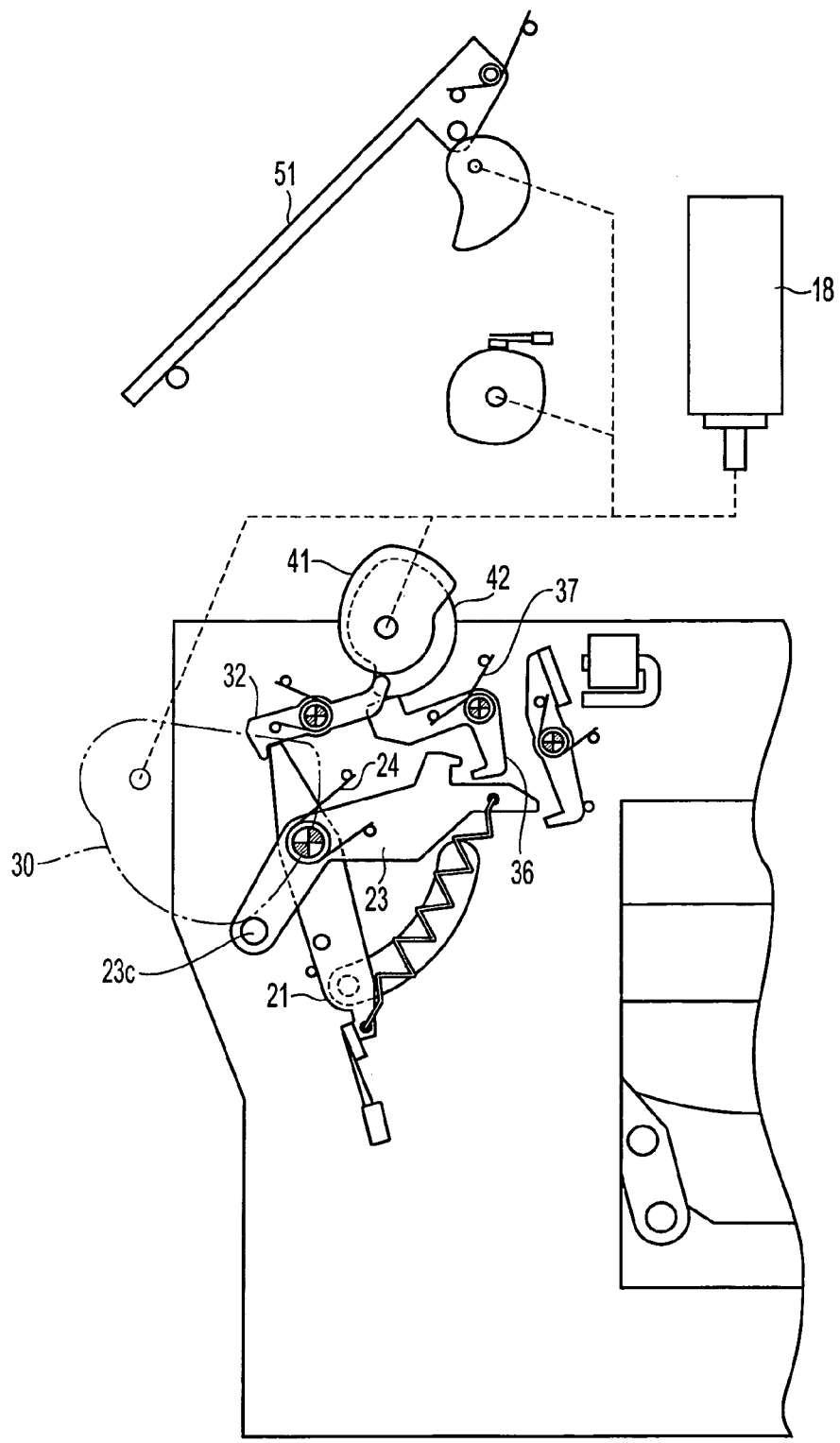
FIG. 9 is a diagram showing a state after "mirror down" after the state shown in FIG. 8.

When the cam angle reaches 310°, as shown in FIG. 9, the mirror 51 completely drops and is returned to the 45° position. Furthermore, while the cam is rotated from 210° to 310°, the charge pin 23c is pressed by the charge cam 30, and the second lever 23 is rotated in the counterclockwise direction against the applied force of the spring 24. At this time, the first lever 21 is engaged by the first engaging lever 32, so the position of FIG. 8 is maintained.

Furthermore, until the cam angle reaches 360°, the second cam 42 is away from the second engaging lever 36, the second engaging lever 36 is rotated in the clockwise direction by the applied force of the spring 37 and engages the second lever 23. When the rotational angle of the cam reaches 360°, it is returned to the state of FIG. 2.

Thus, in the present embodiment, the charge accumulation of the CCD 77 begins in a state where the focal plane shutter 11 is open, that is, in a state where the CCD 77 receives the object luminous flux, and the focal plane shutter 11 is closed after the charge accumulation is completed to shade the CCD 77. Therefore, the shutter speed is controlled as an electronic shutter. That is, the shutter speed is not the shutter speed of the focal plane shutter, but is governed by the charge accumulation time. Accordingly, when a focal plane shutter with relatively low performance and that cannot realize a very high shutter speed is used, it is possible to shoot an image at a high shutter speed by simply changing the charge accumulation time appropriately. Furthermore, as described above, only one set of the blades of the focal plane shutter is needed, and not much accuracy is required for driving, so it is possible to miniaturize the focal plane shutter and reduce the cost.

In the structure of the above embodiment, the CCD 77 functions as a photoelectric converter in an pick-up unit, the shutter driving mechanism includes the levers and cams shown in FIG. 2, and functions as a shutter driver, and the control circuit 101 functions as a controller and also controls charge reading from the CCD.

In the above description, the opening operation of the shutter is performed in the middle of "mirror up," that is, the time between when the release operation is performed and when the CCD charge accumulation begins. However, the opening operation of the shutter can be performed at any time after the reading of the CCD (from a previous image) is completed. For example, if this is realized by the above-mentioned embodiment, the first cam 41 can be structured so that engagement of the first lever 21 by the first engaging lever 32 can be OFF immediately before the cam angle 360° after the charge reading is completed, approximately at the cam angle 310°, and the shutter blade 11a can be opened at the final stage of the charge operation (shooting preparation operation). Additionally, the shooting sequence can be performed by rotating the cam by the sequence motor, but it is also acceptable to open and close the shutter at a specified timing without using a cam by a mechanism using a lever, a spring, or a solenoid, for example.

According to the embodiment explained above, because a focal plane shutter with one set of shutter blades is used as a shielding member of the image pick-up element, it is possible to miniaturize the shutter compared to a focal plane shutter having two sets of blades, and the operation can be simplified in addition to the advantage of saving space.

Figure 12:
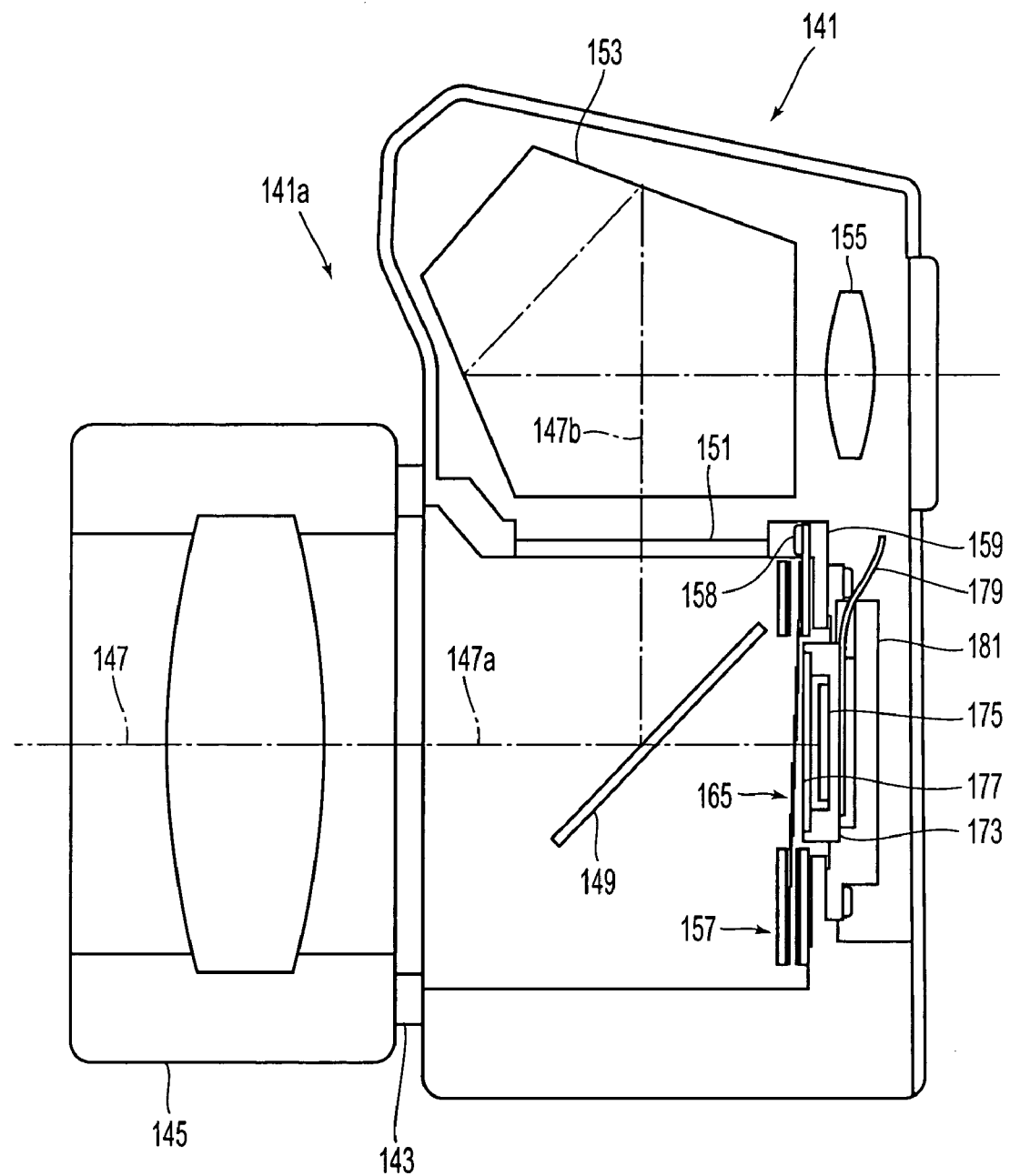
FIG. 12 is a sectional view showing a second embodiment of an electronic still camera according to the present invention.
Figure 13:
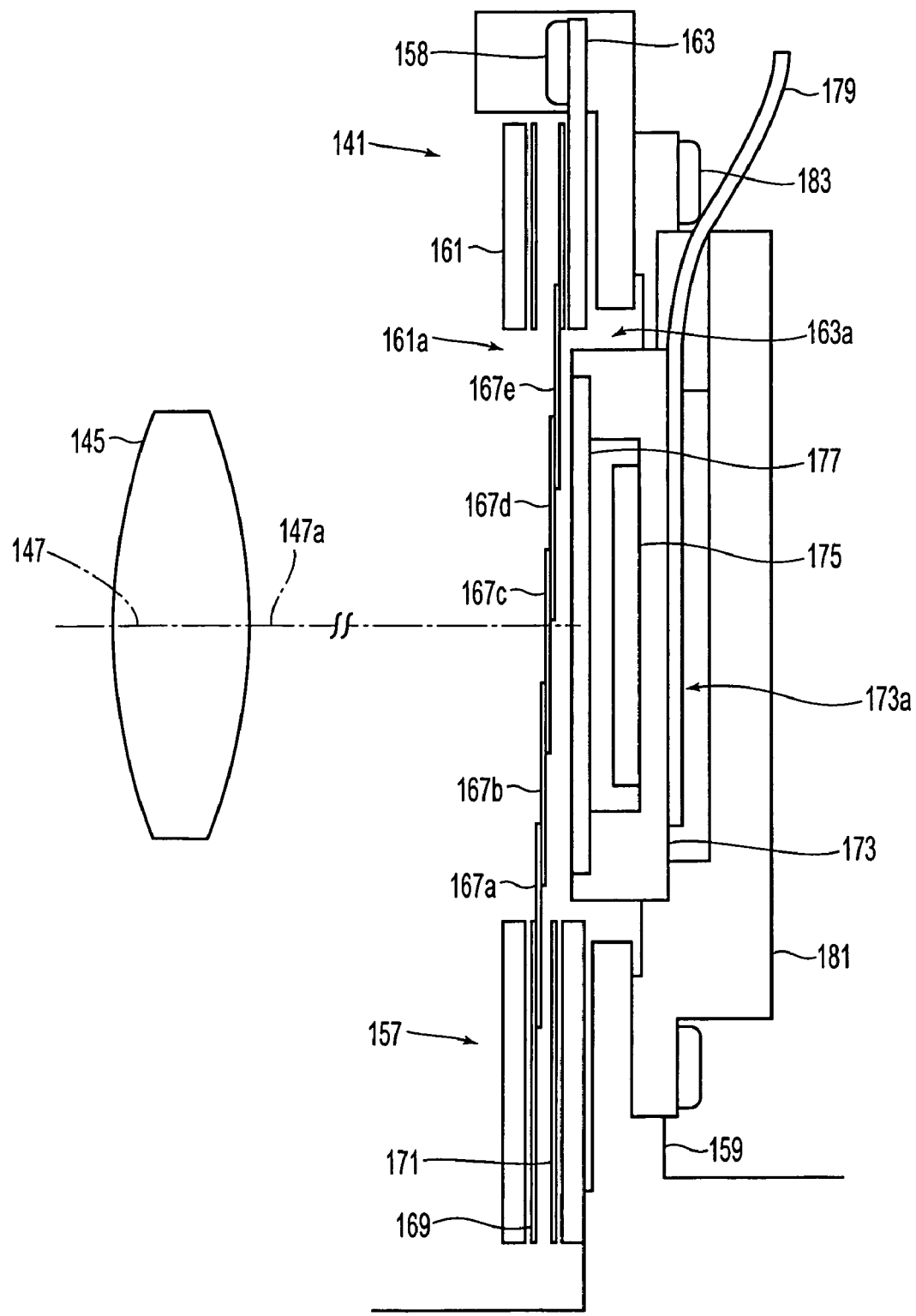
FIG. 13 is a sectional view showing the details of the elements of FIG. 12.

Various embodiments of a shutter unit are explained in detail by using the following drawings. FIGS. 12 and 13 show a second embodiment of a shutter unit of the electronic still camera of the present invention. The camera is structured similarly to the FIG. 1 camera. For example, a lens mount 143 is disposed on the front part 141a of the main camera body 141 of a single lens reflex camera that can interchange lenses. A shooting lens 145 is fixed to the front part 141a of the main camera body 141 through the lens mount 143. Within the main camera body 141, a movable mirror 149 is disposed on the optical path 147a of the shooting light 147 that passes through the shooting lens 145. On the reflected light path 147b of the shooting light 147 reflected by the mirror 149, are disposed a viewfinder screen 151 in which the shooting light 147 is image-formed. A pentaprism 153 and an eyepiece lens 155 are disposed on the side of the viewfinder screen 151 opposite to the side on which the mirror 149 is disposed.

Furthermore, on the optical path 147a of the shooting light 147 within the main camera body 141, a shutter unit 157 is disposed on the rear face side of the mirror 149. The shutter unit 157 is fixed in a frame 159, which is disposed in the main camera body 141 by a screw member 158. As shown in FIG. 13, a lens-side frame 161 is disposed on the shooting lens 145 side of the shutter unit 157. A first opening part 161a to transmit the shooting light 147 is formed in the lens-side frame 161. A shooting unit-side frame 163 is disposed on the side of the shutter unit 157 opposite to the side on which the shooting lens 145 is disposed. A second opening part 163a to transmit the shooting light 147 is formed in the shooting unit-side frame 163.

In the shutter unit 157, a shutter curtain 165 to open and close the optical path 147a of the shooting light 147 is disposed between the lens-side frame 161 and the shooting unit-side frame 163. The shutter curtain 165 includes a plurality of shutter blades 167a, 167b, 167c, 167d, and 167e that slide at approximately a right angle to the optical path 147a of the shooting light 147. The shutter curtain 165 is disposed in a position where the shutter blade 167a with the largest moving amount faces (is closest to) the shooting lens 145. A front control plate 169 and a rear control plate 171 with large opening parts that are the same size as the first and second opening parts 161a and 163a are disposed at the respective faces of the shutter curtain 165. When the shutter curtain 165 is driven, because of the front control plate 169 and the rear control plate 171, the shutter blades 167a-167e do not directly contact the lens-side frame 161 and the shooting unit-side frame 163, and damage to shutter blades 167a-167e is prevented.

On the side of the shutter unit 157 opposite to the shooting lens 145, the image pick-up unit 173 is disposed with its end on the side toward the shooting lens 145 protruding into the second opening part 163a of the shooting unit-side frame 163. In the image pick-up unit 173, for example, a solid-state image pick-up element 175 comprising a CCD or the like is mounted. On the side of the image pick-up unit 173 toward the shutter unit 157, a cover glass 177 is fixed to protect the solid-state image pick-up element 175. On the side of the rear face 173a of the image pick-up unit 173, a flexible substrate 179 is disposed that is connected to the solid-state image pick-up element 175. On the side of the rear face 173a of the image pick-up unit 173, an image pick-up unit holder 181 is fixed to support the image pick-up unit 173 in the main camera body 141. The image pick-up unit holder 181 is fixed in the frame 159 along with the image pick-up unit 173 by screw members 183.

In the electronic still camera described above, when shooting begins, that is, when the release operation is performed, the shutter curtain 165 is open and the charge accumulation into the light receiving part of the solid-state image pick-up element 175 begins. Furthermore, the charge accumulation time of the light receiving part of the solid-state image pick-up element 175 is controlled by the control circuit within the solid-state image pick-up element 175 in a state where the shutter curtain 165 is open, and the exposure time is determined by this control (electronic shutter). After the exposure time expires, as controlled by the control circuit, the shutter curtain 165 is closed in order to shield the solid-state image pick-up element 175.

The respective shutter blades 167a-167e are bent in a direction toward the optical path by the shock that occurs when the shutter curtain 165 is closed. At this time, the shutter blade 167a with the largest moving amount and the largest bend is located on the side toward the shooting lens 145 so that the bent shutter blades 167a-167e can be prevented from contacting the image pick-up unit 173. Because of this, the light receiving part, such as the cover glass 177 of the image pick-up unit 173 can be prevented from being damaged due to contact with the shutter blades.

In the electronic still camera that is thus structured, the shooting lens 145 side of the image pick-up unit 173 disposed within the main camera body 141 is disposed protruding into the shutter unit 157, so it is possible to shorten the length of the main camera body 141 in the direction of the optical path 147a of the shooting lens 145 and to form a smaller main camera body 141 compared to the conventional main camera body.

Furthermore, the shutter curtain 165 includes a plurality of shutter blades 167a-167e, and the shutter blade 167a with the largest moving amount and the largest bend when the shutter curtain 165 is closed is positioned on the side toward the shooting lens 145 and disposed within the shutter unit 157. Therefore, particularly, when a shutter unit 157 is-structured that has a relatively large shock when the shutter curtain 165 is closed and the shutter curtain 165 is driven at a high speed, it is possible to prevent the bent shutter blades 167a-167e from contacting the image pick-up unit 173, and it is possible to prevent the light receiving part, such as the cover glass 177, of the image pick-up unit 173 from being damaged due to contact.

Figure 14:
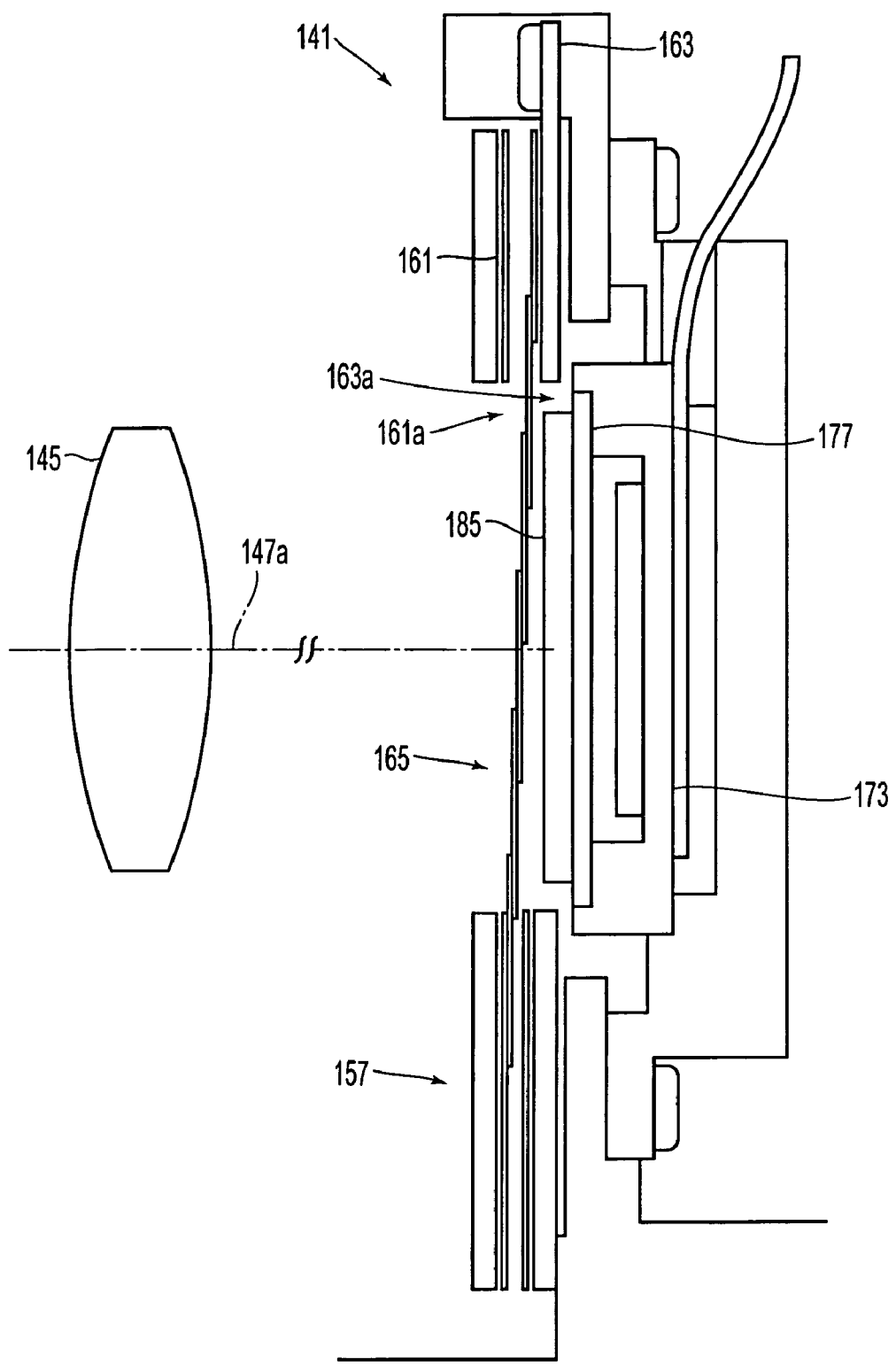
FIG. 14 is a sectional view showing a third embodiment of an electronic still camera according to the present invention.

FIG. 14 shows a third embodiment of the shutter unit of the electronic still camera of the present invention. In this embodiment, on the cover glass 177 of the image pick-up unit 173, for example, a filter 185 that removes the high frequency component of the shooting light, which causes noise, is attached. The shooting lens 145 side of the filter 185 protrudes into the second opening part 163a of the shooting unit-side frame 163 of the shutter unit 157. It is also possible to obtain the same effects in the electronic still camera of the third embodiment as in the second embodiment as described above. However, in the third embodiment, the image pick-up unit 173 with the filter 185 on the shooting lens 145 side protrudes into the shutter unit 157. Therefore, particularly, it is possible to shorten the length of the main camera body 141 in the direction of the optical path 147a of the shooting lens 145 when the main camera body 141 has the filter 185 to remove noise components or the like, and it is possible to form a smaller main camera body 141 compared to the conventional main camera body.

Figure 15:
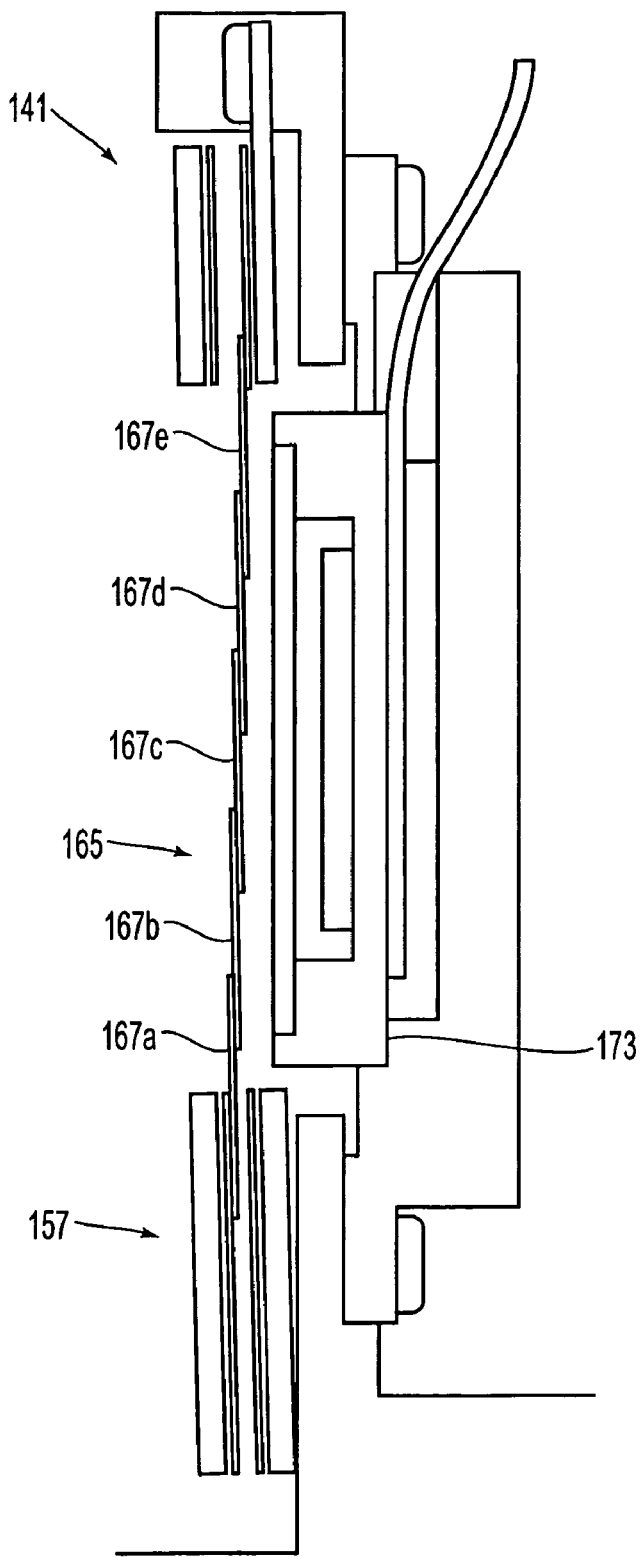
FIG. 15 is a sectional view showing a fourth embodiment of an electronic still camera according to the present invention.

FIG. 15 shows a fourth embodiment of the shutter unit of the electronic still camera of the present invention. In this embodiment, the shutter unit 157 is disposed at an angle with respect to the image pick-up unit in a state where the shutter curtain 165 is closed so that the distance between the respective blades 167a-167e and the image pick-up unit 173 is substantially equal. In the electronic still camera of this embodiment, because the shutter unit 157 is disposed at an angle in the main camera body 141 so that the distance between the shutter blades 167a-167e and the image pick-up unit 173 is equal when the shutter blades 167a-167e of the shutter curtain 165 are closed, particularly, when a shutter unit 157 is structured such that the shutter curtain 165 is driven at a relatively low speed, the shock is small when the shutter curtain 165 is closed, and there is little bending of the shutter blades 167a-167e. This makes it possible to dispose the shutter unit 157 close to the image pick-up unit 173.

Figure 16:
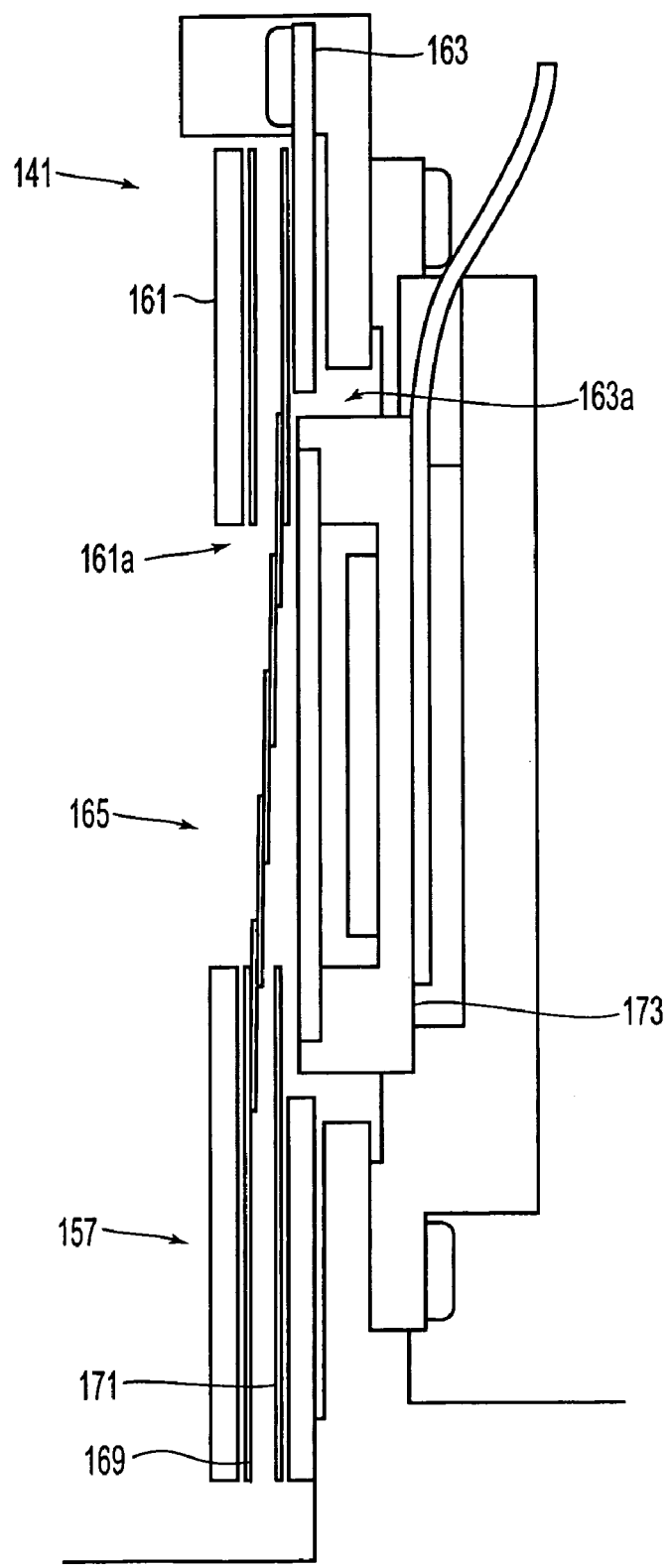
FIG. 16 is a sectional view showing a fifth embodiment of an electronic still camera according to the present invention.
Figure 17:
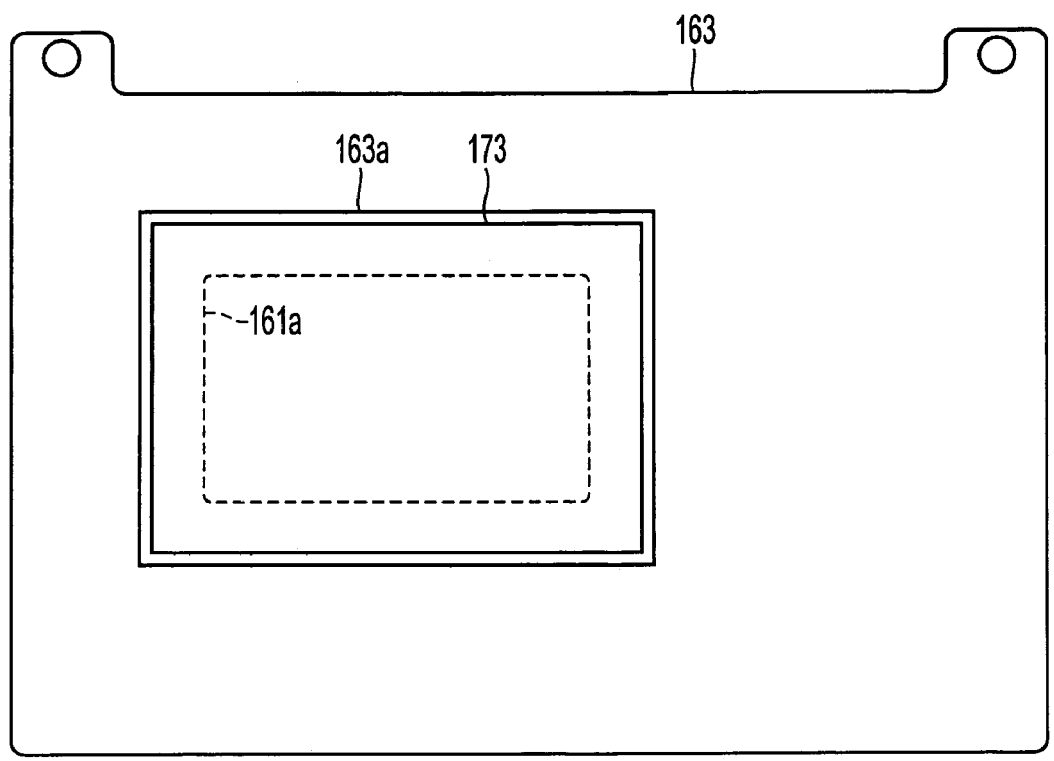
FIG. 17 is a view of the FIG. 16 structure as seen from the rear direction of the main camera body.

FIGS. 16 and 17 show a fifth embodiment of the shutter unit of the electronic still camera of the present invention. In this embodiment, the first opening part 161a of the lens-side frame 161 of the shutter unit 157 is formed smaller than the second opening part 163a of the image pick-up unit-side frame 163 and the cross section of the shutter unit 157 side of the image pick-up unit 173. Furthermore, the shutter curtain 165, the front-side control plate 169, and the rear-side control plate 171 are formed in a size corresponding to the first opening part 161a of the lens-side frame 161. In the electronic still camera of this embodiment, the first opening part 161a of the lens-side frame 161 is formed smaller than the cross section of the shutter unit 157 side of the image pick-up unit 173, and the shutter curtain 165 is formed in a size corresponding to the first opening part 161a. Therefore, the shutter curtain 165 can be formed smaller compared to the conventional shutter curtain. Because of this, it is possible to minimize the shock when the shutter curtain 165 is closed and the bending of the shutter curtain 165 can be minimized, so it is possible to dispose the image pick-up unit 173 in a position where it can be close to the shutter curtain 165 of the shutter unit 157. Additionally, the second opening part 163a of the image pick-up unit-side frame 163 disposed on the image pick-up unit 173 side of the shutter curtain 165 is formed larger than the first opening part 161a of the lens-side frame 161. Thus, the first opening part 161a can be formed small regardless of the size of the second opening part 163a, and the shutter curtain 165 can be formed small.

Figure 18:
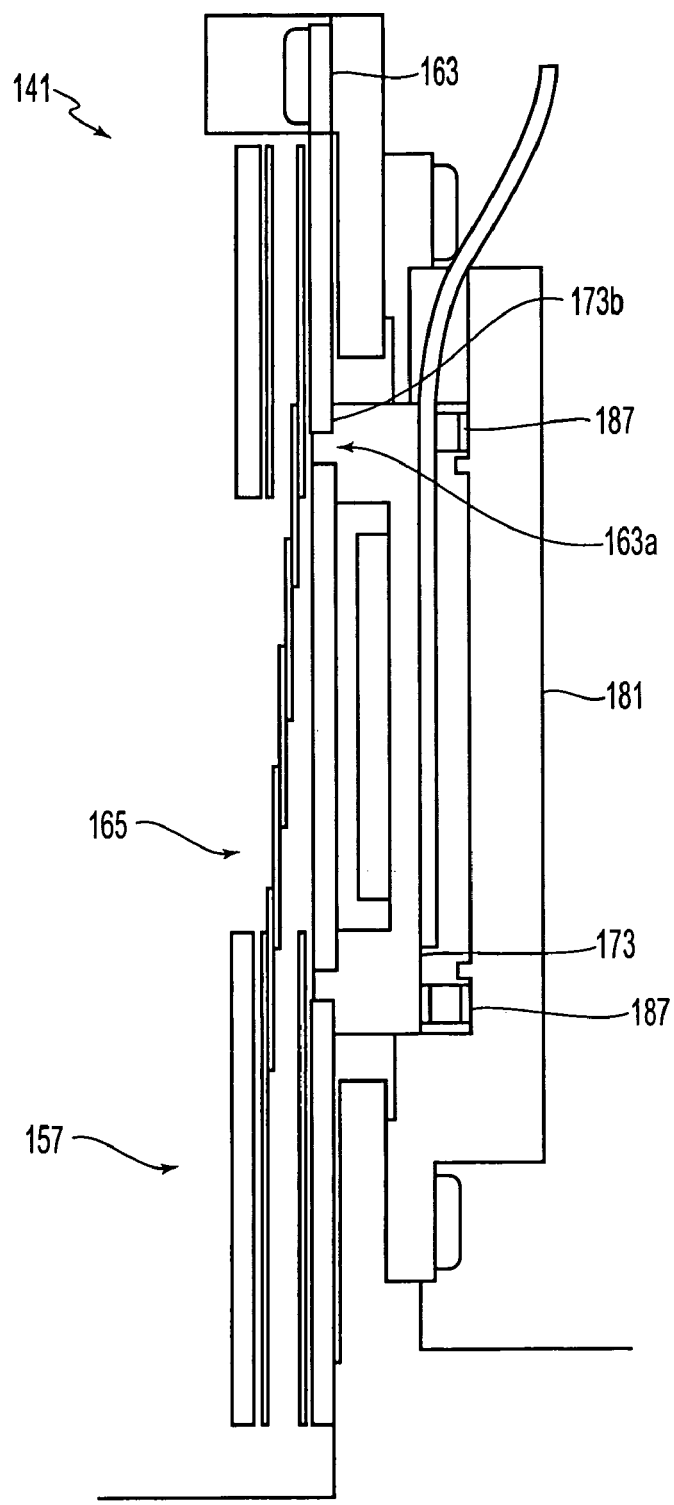
FIG. 18 is a sectional view showing a sixth embodiment of an electronic still camera according to the present invention.

FIG. 18 shows a sixth embodiment of the shutter unit of the electronic still camera of the present invention. In this embodiment, a surface feature 173b (a step) is formed on the periphery of the image pick-up unit 173 on the shutter unit 157 side. The surface feature 173b contacts the internal circumference of the second opening part 163a of the shooting unit side-frame 163 of the shutter unit 157. Furthermore, a plate spring member 187 is disposed on the image pick-up unit 173 side of the image pick-up unit holder 181, and the image pick-up unit 173 contacts the shooting unit-side frame 163 in a pressing state by the plate spring member 187.

In the electronic still camera of this embodiment, because the shutter unit 157 side of the image pick-up unit 173 contacts the shutter unit 157 in a pressing state, the image pick-up unit 173 and the shutter unit 157 can be disposed with a high dimensional accuracy, and the image pick-up unit 173 can be disposed in a position that is closer to the shutter curtain 165.

In the embodiments described above, examples were described that applied the present invention to the main camera body 141 of a single lens reflex camera that can interchange lenses. However, the present invention is not limited to these embodiments, and, for example, it is acceptable to apply the present invention to an electronic still camera with an integrated lens.

In addition, in the embodiments described above, examples were described in which the shutter curtain 165 was structured by a plurality of shutter blades 167a-167e. However, the present invention is not limited to these embodiments, and, for example, it is acceptable to structure the shutter curtain 165 by front and rear curtains, each having a plurality of shutter blades, respectively.

In some embodiments of the electronic still camera described above, because the shooting lens side of the image pick-up unit disposed in the main camera body is disposed protruding into the shutter unit, the length of the main camera body in the direction of the optical path of the shooting lens can be shortened and the main camera body can be formed smaller compared to the conventional main camera body.

In some embodiments of the electronic still camera described above, because the image pick-up unit with a filter in the shooting lens side is disposed protruding into the shutter unit, particularly, the length of the main camera body with a filter to remove noise components or the like in the direction of the optical path of the shooting lens can be shortened and the main camera body can be formed smaller compared to the conventional main camera body.

In some embodiments of the electronic still camera described above, a shutter curtain comprising a plurality of shutter blades is disposed in the shutter unit so that the shutter blade with the largest moving amount and the largest bend when the shutter curtain is closed is positioned on the shooting lens side. Therefore, particularly, when the shutter unit is structured such that the shutter curtain is driven at a high speed and there is a relatively large shock when the shutter curtain is closed, the bent shutter blade can be prevented from contacting the image pick-up unit, and damage to the light receiving part, such as a cover glass, of the image pick-up unit due to contact can be prevented.

In some embodiments of the electronic still camera described above, because the shutter unit is disposed at an angle in the main camera body so that the distance between the shutter blade and the image pick-up unit is equal when the shutter blade of the shutter curtain is closed, particularly, when a shutter unit is structured such that the shutter curtain is driven at a relatively low speed, the shock is small when the shutter curtain is closed, and there is little bending of the shutter blades. Thus, the shutter unit can be disposed close to the image pick-up unit.

In some embodiments of the electronic still camera described above, the first opening part of the lens-side frame disposed on the shooting lens side of the shutter curtain is formed smaller than the cross section of the shutter unit side of the image pick-up unit and the shutter curtain is formed in a size corresponding to the first opening part, so the shutter curtain can be formed smaller compared to the conventional shutter curtain. Because of this, the shock can be small when the shutter curtain is closed, and the bending of the shutter curtain can be minimized. Thus, the image pick-up unit can be disposed in a position close to the shutter curtain of the shutter unit.

In some embodiments of the electronic still camera described above, because the second opening part of the image pick-up unit-side frame disposed in the image pick-up unit-side of the shutter curtain is formed larger than the first opening part of the lens-side frame, the first opening part can be formed small regardless of the size of the second opening part and the shutter curtain can be formed small.

In some embodiments of the electronic still camera described above, because the shooting lens side of the image pick-up unit contacts the shutter unit in a pressing state, it is possible to dispose the image pick-up unit and the shutter unit with high dimensional accuracy, and the image pick-up unit can be disposed in a position closer to the shutter curtain.

In the described embodiments, the image pick-up element was a CCD. The invention can be used with other types of devices that convert light energy into charge. Such devices are referred to as photoelectric converters. Other photoelectric converters include, for example, Photo-Sensitive-Diodes (PSDs) and CMOS devices.

The invention also is applicable to electronic cameras that take moving pictures as well as still pictures.

While the present invention has been described with reference to preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. An electronic camera comprising:
    an image pick-up unit disposed on an optical path of light that enters the electronic camera, the image pick-up unit including a photoelectric converter that receives the light; and
    a shutter unit disposed on the optical path between the photoelectric converter and a portion of the camera through which the light enters the camera, the shutter unit housing a single set of a plurality of shutter blades;
    a portion of the image pick-up unit that opposes the shutter unit protruding into a portion of the shutter unit,
    wherein the shutter unit includes a lens-side frame located on one side of the plurality of shutter blades that faces away from the image pick-up unit, the lens-side frame has a first opening part to transmit the light to the plurality of shutter blades, and an image pick-up unit-side frame on other side of the shutter unit that opposes the image pick-up unit, the image pick-up unit-side frame has a second opening part to transmit the light to the photoelectric converter,
    wherein all of the shutter blades are disposed between the lens-side frame and the image pick-up unit-side frame, the portion of the image pick-up unit that opposes the shutter unit is located between all of the shutter blades and the photoelectric converter when all of the shutter blades are in extended positions to block the light from reaching the photoelectric converter, and protruding into the second opening part of the image pick-up unit-side frame.

2. The electronic camera of claim 1, wherein the portion of the image pick-up unit that opposes the shutter unit has a filter, the filter located between all of the shutter blades and the photoelectric converter, and the filter protrudes into the second opening part of the image pick-up unit-side frame.

3. The electronic camera of claim 1, wherein the plurality of shutter blades move at approximately a right angle to the optical path of the light, and a shutter blade that moves by a largest amount is disposed farther from the photoelectric converter than other ones of the shutter blades.

4. The electronic camera of claim 1, wherein the plurality of shutter blades move at approximately a right angle to the optical path of the light, and the shutter unit is disposed at an angle in a main camera body of the electronic camera so that, when the shutter blades are in a closed state, a distance between each of the respective shutter blades and the image pick-up unit is substantially equal.

5. The electronic camera of claim 1, wherein the first opening part is formed smaller than a cross-section of the portion of the image pick-up unit that opposes the shutter unit, and the plurality of shutter blades have a size corresponding to the first opening part.

6. The electronic camera of claim 5, wherein the second opening part is formed larger than the first opening part and larger than the cross-section of the portion of the image pick-up unit that opposes the shutter unit.

7. The electronic camera of claim 1, wherein the portion of the image pick-up unit that opposes the shutter unit is in contact with the shutter unit.

8. The electronic camera of claim 7, further comprising a resilient member that presses the image pick-up unit into contact with the shutter unit.

* * * * *